United States Patent [19]

Blackstone

[11] Patent Number: 5,002,490

[45] Date of Patent: Mar. 26, 1991

[54] MOCK AIR BATTLE SYSTEM

[76] Inventor: Michael E. Blackstone, 6 Alcams, Irvine, Calif. 92714

[21] Appl. No.: 455,515

[22] Filed: Dec. 21, 1989

[51] Int. Cl.$^5$ .............................................. G09B 9/00
[52] U.S. Cl. ..................................................... 434/14
[58] Field of Search .......................... 434/14, 15, 16; 89/41.06; 273/311, 313

[56] References Cited

U.S. PATENT DOCUMENTS

| | | | |
|---|---|---|---|
| 3,659,494 | 5/1972 | Philbrick et al. | 89/41.06 X |
| 3,845,276 | 10/1974 | Kendy et al. | 89/41.06 X |
| 4,202,246 | 5/1980 | Schertz et al. | 89/41.06 X |
| 4,682,953 | 7/1987 | Poerfel et al. | 434/16 |

Primary Examiner—Richard J. Apley
Assistant Examiner—Glenn E. Richman
Attorney, Agent, or Firm—Knobbe, Martens, Olson & Bear

[57] ABSTRACT

A system to simulate in-flight aircraft combat includes an energy sensitive switch intermediate a power source and signal generator. The switch has a first state which prevents the transmission of current from the power source to the signal generator and a second state which permits current to flow from the power source to the signal generator. The switch changes state when exposed to a given level of energy and permits current to flow to the signal generator which indicates a "hit". In a first embodiment, a sight is provided to align the attacking aircraft with the target. A trigger mechanism is mounted in the attacking aircraft which initiates the transmission of current from the power source to the signal generator. The optical switch changes state in response to exposure to energy emitted from an energy source mounted on the target. The pilot of the attacking aircraft trips the trigger when the target is aligned relative to the sight. If energy is detected when the trigger is tripped, the signal generators indicate a "hit". In a second embodiment, a trigger mechanism mounted in the cockpit of the attacking aircraft is used to initiate the transmission of energy from an energy source mounted on the attacking aircraft. An optical switch located on the target changes state when exposed to energy emitted from the attacking aircraft. The switch is located intermediate a power source and signal generator so that when energy is detected, current flows from the power source to the signal generator and a "hit" is indicated.

30 Claims, 2 Drawing Sheets

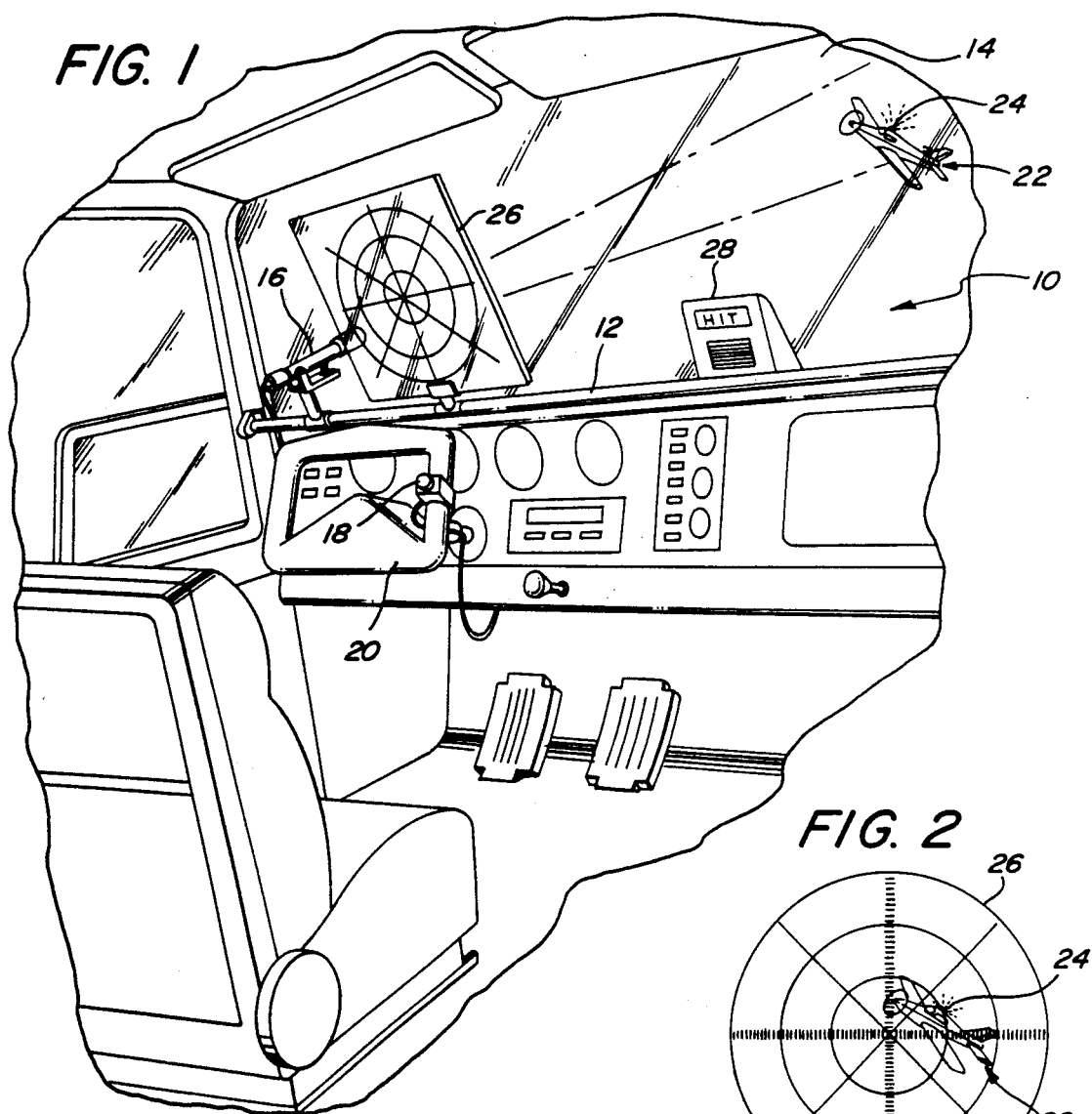
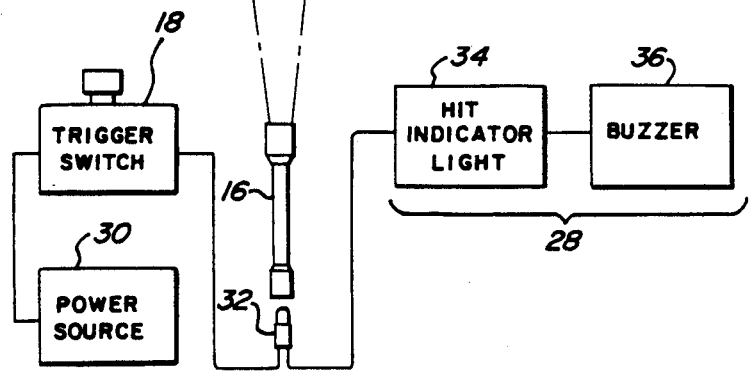

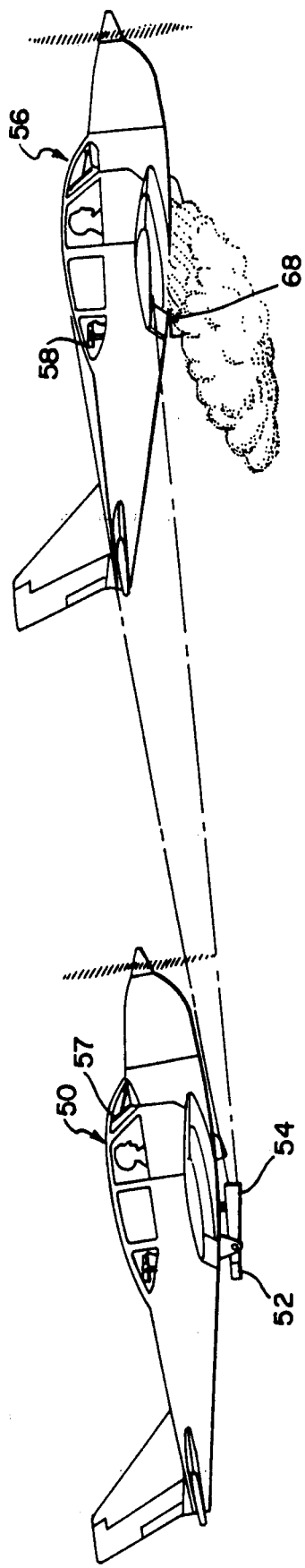
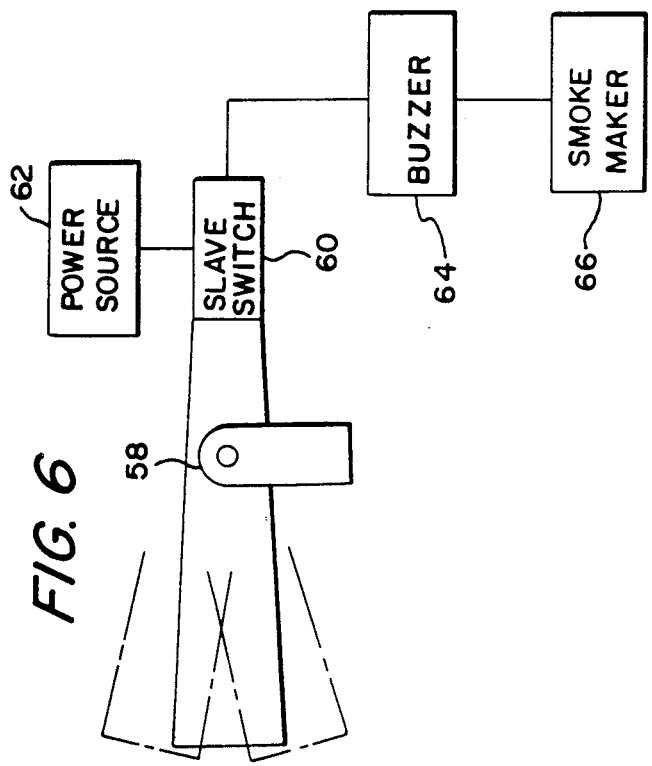
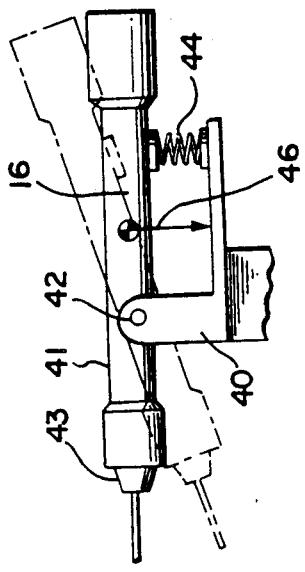

MOCK AIR BATTLE SYSTEM

FIELD OF THE INVENTION

The present invention generally relates to systems used to simulate aircraft battles, and in particular, to those systems which enable mock air battles to be conducted between aircraft.

BACKGROUND OF THE INVENTION

Systems which simulate aircraft battles are commonly used for training military fighter pilots. These systems determine whether a "hit" would have occurred from a fired missile or gunshot, based upon the relative position of the aircraft when the system is triggered, and signal both the attacking aircraft and target aircraft when a hit has occurred. The systems presently in use are very similar to the actual on-board target systems used in air combat battles with enemy aircraft and incorporate a complex laser and radar system.

In-flight aircraft battle simulators of this type are not designed for use by the general public. The laser systems used by the military are expensive to implement and therefore impractical for most civilian pilots. The systems also utilize high-power laser light which could have damaging effects on the eyes when operated without protective goggles. In addition, the simulators require advanced radar and tracking systems and would be difficult to install on the majority of aircraft flown by civilian pilots.

Contributing to the difficulty of developing a mock air battle system for civilian pilots is the safety factor. Current Federal Aviation Administration (FAA) requirements limit the minimum distance between aircraft to 500 feet. Thus, any type of simulation system must be capable of detecting target aircraft at long distances to comply with this regulation and maintain a high level of safety.

A mock air battle system should also be realistic enough to present a challenge to the user. The user will want the system to operate as close to an actual air combat battle as possible. Therefore, the system should include visual and audio effects which will provide the excitement and drama associated with enemy aircraft encounters.

Thus, there is a need for a mock air battle system that is economical and easy to install which operates at safe distances while maintaining the realistic aspects of in-flight pursuit.

SUMMARY OF THE INVENTION

The mock air battle system of the present invention satisfies the need of the prior art by providing a safe, simple, and economical way to simulate an aircraft battle either between two aircraft or between an aircraft and the ground. The system comprises few parts, thus increasing reliability while enabling the system to be easily installed on a wide range of aircraft at relatively low costs to the users.

The simulation system of the present invention includes a power source which generates a current and a signal generator which generates a signal which can be perceived by a human being in response to current from the power source. Typically, the signal generator will generate a signal in response to a "hit." A trigger mechanism is mounted in the cockpit of the attacking aircraft for initiating the transmission of current from the power source to the signal generator. Intermediate the power source and signal generator is an energy sensitive switch. The switch has a first state which prevents the transmission of current from the power source to the signal generator and a second state which permits the transmission of current from the power source to the signal generator. The switch changes state when exposed to energy emitted from an energy source mounted on the target. A sight is provided to assist the aligning of the attacking aircraft with the target. The system further incorporates a shield for blocking the energy emitted from the target's energy source from affecting the state of the switch when the target is not aligned with the sight.

The pilot of the attacking aircraft positions the target within the sight and trips the trigger when the target is properly positioned relative the sight. If energy is detected when the trigger is tripped, the "hit" is confirmed by the signal from the signal generator. When the target is another aircraft, preferably the signal can be perceived in both the cockpit of the attacking aircraft and the cockpit of the target aircraft.

In a preferred embodiment, the system advantageously utilizes visible light from a strobe mounted on the aircraft to locate and shoot the target aircraft, and thus avoids the dangers associated with laser light. The tube-shaped body of a scope and a mating cap mounted on the attacking aircraft acts as the shield and prevents the switch from changing state when the switch is not aligned with the sight. In addition, the scope includes a pair of parallel lenses which focus the light on the switch, thereby increasing the effective responsiveness of the switch. As a result of the scope focusing the light on the switch, the system's effective range is extended from 500 feet, the minimum safe distance permitted by the FAA, to approximately one mile, thereby ensuring that safe distances can be maintained between the attacking and target aircraft.

The realism of the system is further enhanced by a unique mounting system which changes the position of the scope in response to gravitational forces exerted on the aircraft, forcing the pilot to compensate and lead the target when he presses the trigger in order to align the light pulse with the scope.

The scope limits the field from which incoming light detected by the switch, increasing the challenge and making the simulation more realistic to the users. Desirably, the power of the scope can be adjusted to correspond to the level of skill of the user. A lower power setting will increase the angle of inclusion (i.e., the angle from within which the scope will focus energy) for light sources which will be detected by the optical switch thereby making it easier to register a "hit". On the other hand, by utilizing a high power setting, the angle of inclusion for light sources which will be detected by the switch will be considerably narrowed, thereby substantially increasing the level of skill required to "hit" the target aircraft, yet enabling the system to score a "hit" on target aircraft over greater distances, giving the pilot the sensation of higher performance weaponry.

In this preferred embodiment, when a "hit" is registered, an audio and visual light signal is generated and provided to the pilot of the attacking aircraft. The audio signal is also transmitted to a receiver at the target by means of a radio transmitter in the attacking aircraft. As described above, the switch changes state and permits the transmission of current from the power source to the signal generator in response to a given level of light energy. Preferably, the switch does not change back to its current prevention state until it is reset. This enhances the excitement of the system for the users by enabling the audio and visual signals produced by the signal generator to be extended for longer durations of time.

In an alternative embodiment, the system includes a power source and a signal generator which typically generates a signal in response to a "hit". An energy sensitive switch is mounted on the target intermediate the power source and signal generator. The switch has a first state which prevents the transmission of current from the power source to the signal generator and an second state which permits the transmission of current from the power source to the signal generator. The switch changes state when exposed to energy emitted from an energy source on the attacking aircraft. A trigger mechanism mounted in the attacking aircraft initiates the emission of the energy from the energy source. A sight assists the aligning of the attacking aircraft with the target. The system also includes a shield mounted on the target which blocks energy emitted from the energy source on the attacking aircraft from affecting the state of the switch when the target is not aligned with the sight.

The pilot of the attacking aircraft positions the target within the sight and trips the trigger when the target is properly positioned relative to the sight. If energy is detected by the optical switch on the target, the "hit" is confirmed by the signal from the signal generator. Again, when the target is another aircraft, it is preferable that the signal be perceived in the cockpit of both aircraft.

In this second embodiment, the energy source is typically a strobe mounted on the attacking aircraft. A scope, as described above, acts as the shield which blocks energy emitted from the strobe from affecting the switch when the target is not aligned with the sight, and also serves to focus the light emitted from the strobe on the switch when the source is aligned with the sight, advantageously increasing the responsiveness of the switch to the emitted light energy. As in the first embodiment, the scope further limits the range of incoming light detected by the switch which makes the system more challenging for the users, while extending the system's range and ensuring that safe distances are maintained between the attacking aircraft and the target.

The challenge of the system is further increased by a second shield mounted on the attacking aircraft which blocks energy emitted from the strobe and diminishes the range of angles from which the strobe will affect the state of the optical switch, thereby making it more difficult to align the attacking aircraft with the target such that the optical switch will be exposed to a sufficient amount of light energy and the signal generator will indicate a "hit". The shield is mounted such that the position of the shield changes in response to gravitational forces exerted on the aircraft. The pilot of the attacking aircraft is thus forced to compensate for this and lead the target when he presses the trigger to align the strobe with the sight.

Preferably, when a "hit" is registered an audio signal is provided to the pilot of the attacking aircraft and transmitted to a receiver at the target using a radio transmitter. It is also desirable that a "hit" activate the smoke system of the target aircraft. In this manner, when the attacking aircraft scores a "hit", plumes of smoke are emitted from the target aircraft to simulate the explosion that would result from actual combat and provide the excitement and realism of an aircraft battle.

BRIEF DESCRIPTION OF THE DRAWINGS

FIG. is a perspective view of the system of the present invention installed in the cockpit of an airplane and another aircraft;

FIG. 2 is an enlarged view of the sight;

FIG. 3 is a diagram of the switching circuit of one embodiment of the present invention;

FIG. 4 is an elevation view of the scope and its mounting mechanism;

FIG. 5 is a perspective view of an alternative embodiment of the system mounted on two aircraft; and FIG. 6 is a diagram of the switching circuit of the system depicted in FIG. 5.

DETAILED DESCRIPTION OF THE PREFERRED EMBODIMENTS

As illustrated in FIG. 1, the system of the present invention is installed in the cockpit of an attacking airplane, generally designated 10. The cockpit includes a horizontal bar 12 which extends along the bottom of a windshield 14 inside the cockpit 10. A scope 16 is mounted on the bar 12 and faces the windshield 14. A trigger mechanism 18 is attached to a control stick 20 so as to be within easy reach of the pilot. A target aircraft 22 is equipped with a pulsating strobe light 24 and is seen through the windshield 14 of the attacking aircraft. A reflecting gunsight 26 is mounted to the horizontal bar 12 and positioned to be within the view of the pilot of the attacking aircraft. The cockpit 10 is further equipped with a signal generator 28 also mounted on the bar 12 which can be seen by the pilot.

As shown in more detail in FIG. 2, the gunsight 26 is gauged to indicate the position of the target aircraft 22 relative to the attacking aircraft and thus assist the pilot in aligning the attacking aircraft with the target 22. The gunsight 26 includes a clear piece of glass at a 45° angle. Gunsights of this type are well known and a gunsight having the above described characteristics is a Navy war surplus Model Mark 8.

As illustrated schematically in FIG. 3, the trigger mechanism 18 is connected to a power source 30 which generates a current. Most aircraft are equipped with a 28 volt power supply which supplies power to the electrical system of the aircraft and generates a sufficient amount of current to operate the system of the present invention. The trigger 18 serves to initiate the transmission of the current from the power source 30 to an audio and visual signal generator 28. An optical switch 32 is located intermediate the power source 32 and signal generator 28. The switch 32 is mounted at the back of the scope 16 such that light is focused on the optical switch 32 when the strobe 24 is aligned with the sight 26.

Preferably, the switch 32 is a latching slave switch which is responsive to optical energy. Switches of this type are commonly used in the photography field and manufactured by Wein Products. The switch 32 has an open and closed state. In the open state, the switch 32 prevents the transmission of current from the power source 30 to the signal generator 28 by creating an open circuit. In the closed state, the switch 32 completes the circuit and permits current to flow from the power source 30 to the signal generator 28. The switch 32 changes between the first and second states in response to exposure to a given level of optical energy. In the above-described switch 32, this transition occurs when the switch is exposed to approximately 50 watt-seconds of optical energy.

The switch 32 remains closed and conducts current to the signal generator 28 as long as voltage is supplied by the power source 30. When the trigger 18 is lifted, the voltage is relieved and the switch 32 resets. Because the switch 32 remains closed until it is reset, the signals produced by the signal generator 28 are longer in duration and increase the level of excitement for the users.

Preferably, the signal generator 28 generates a hit indicator light 34 and buzzer 36 which is transmitted over a radio transmitter to the target 22. The hit indicator light is preferably in the form of an LED display which indicates the word "hit" to the pilot of the attacking aircraft.

In an important aspect of the invention, the tube-shaped body 41 of the scope 16 and a mating end cap 43 which covers the switch 32, act as a shield and block the light pulses emitted from the strobe 24 from affecting the state of the optical switch 32 when the strobe 24 is not aligned with the sight 26, thus increasing the level of difficulty associated with aligning the strobe 24 with the sight 26. Furthermore, the scope 16 includes a pair of parallel optical lenses which focus the light pulses from the target aircraft 22 onto the optical switch 32. Rifle scopes of this type are currently manufactured under the trademark BUSHNELL. The scope 16 can be of varying powers, it is believed that a reasonable range would be from a 6 power to a 48 power scope. The increase in scope power produces a corresponding increase in range at which sufficient light will be focused on the optical switch 32 to effect the transition in state of the switch and permit current to flow to the hit indicator light 34 and buzzer 36. Additionally, the increase in the scope power will result in a smaller angle of inclusion (i.e., the angle from within which the scope will focus energy) and thus, increase the difficulty of focusing the light pulses from the target aircraft 22 onto the optical switch 32. Preferably the scope will be between 12 and 24 power, with the power adjustable to the level of skill of the user. When the scope is set at 12 power it produces an angle of inclusion of approximately 30°. That is, the scope will focus light emitted from any power source positioned within a cone defined by a series of rays in a direction originating at 15° from the center line of the scope. The use of the scope 16 as described above is an important advantage of the system of the present invention as it allows an increased distance to be maintained between the attacking and target aircraft while still exposing the switch 32 to a sufficient amount of optical energy.

FIG. 4 illustrates an important aspect of the scope mounting means. The scope 16 is mounted with its rearward end on a support arm 40. A mounting pin 42 is attached to the support arm 40 and scope 16 and defines an axis about which the scope 16 pivots. The scope 16 is mounted such that it is even with the centerline of the aircraft at 1 g. This calibration is easily accomplished while on the ground by positioning the target aircraft 22 in the center of the sight 26 in the attacking aircraft. The scope 16 is then positioned so that it generates the hit indicator light 34 and buzzer 36 signaling a "hit". The forward end of the scope 16 is mounted on a spring 44 having a given spring constant. The spring constant is such that at 6 g, the maximum force experienced by the aircraft, the spring 44 is not completely compressed.

The forces of gravity acting at the center of gravity of the scope, designated by the arrow 46, compress the spring 44 and pivot the scope 16 by a distance proportional to the amount of force applied normal to the spring 44. This mounting means effectively changes the position of the scope 16 relative to the sight 26 and increases the degree of difficulty of the system when increased g forces are acting on the aircraft. For example, during a rapid turn, increased g forces will be exerted on the aircraft and therefore on the scope, causing the end of the scope supported by the spring to be depressed. The pilot must compensate for these forces, as would an actual fighter pilot, by aligning the target differently within the sight so that the strobe 24 will properly aligned with the scope 16 and the depression of the trigger result in a "hit".

In a mock air battle, the pilot in the attacking aircraft aligns the target aircraft 22 in the sight 26. When the target aircraft 22 is correctly aligned in the sight 26, the trigger 18 is depressed and current flows from the power source 30 to the optical switch 32. The light energy pulsing from the strobe 24 on the target aircraft 22 is exposed to the optical switch 32 and closes the switch 32, thus permitting the current to flow from the power source 30 to the hit indicator light 34 and buzzer 36.

In an alternative embodiment illustrated in FIG. 5 and FIG. 6, an attacking aircraft 50 is equipped with a strobe 52 mounted on the bottom of the aircraft 50 at the back end of a hollow tube 54 such that any light emitted by the strobe must exit through the front end of the tube 54. A trigger mechanism identical to that of the first embodiment is mounted within the cockpit of the attacking aircraft 50 and controls the operation of the strobe 52.

As will be apparent, to those of skill in the art, however, the scope, strobe and trigger could be readily mounted on the ground for simulation of a defense to an air attack. A target aircraft 56 is equipped with a scope 58 which is fixedly mounted in the rear of the cockpit and faces backward as shown in FIG. 5. A sight 51 is mounted in the cockpit of the attacking aircraft 50 to assist the aligning of the attacking aircraft 50 with the target aircraft 56.

Referring to FIG. 6, a power source 62 in the target aircraft 56 is connected to signal generators in the form of a buzzer 64 and a smoke maker 66. An optical switch 60, identical to that in the previous embodiment, is located intermediate the power source 62 and the buzzer 64. Generally, the switch will be open, preventing the transmission of current from the power source 62 to the buzzer 64 and smoke maker 66. When the switch 60 is exposed to a given level of light energy, it changes state and permits current to flow from the power source 62 to the buzzer 64 and smoke maker 66.

The tube 54 on the attacking aircraft 50 provides a shield such that the switch 60 is not exposed to the light energy emitted by the strobe 52 when the target 56 is not aligned with the sight 51. When the target 56 is aligned with the sight 51, the pilot in the attacking aircraft 50 presses the trigger and generates a current to the strobe light 52 which emits light energy. The optical switch 60 is exposed to the light energy emitted from the attacking aircraft 50 and changes state, allowing current to flow from the power source 62 to the buzzer 64 and smoke maker 66. As in the previous described embodiment, the current transmitted by the switch 60 could also be used to activate another switch, such as a solenoid, which would complete a circuit having a separate power source to drive the buzzer 64 and smoke maker 66.

The tube 54 and scope 58 advantageously increase the challenge associated with the system. The tube 54 blocks the light energy emitted from the strobe 52 on the attacking aircraft 50 from affecting the state of the switch 60 when the target aircraft 56 is not aligned with the sight 51. The tube 54 further increases the difficulty of aligning the target aircraft 56 with the sight 51 by diminishing the range of angles from which the strobe 52 will affect the state of the optical switch 54. The tube 54 is spring mounted analogous to the manner of the mounting of the scope 16 of the previous embodiment, thus its position relative to the switch 60 is affected by the gravitational forces exerted on the attacking aircraft 50. This advantageously forces the pilot of the attacking aircraft 50 to align the target 56 differently within the sight 51 when increased g forces are acting on the aircraft so that the strobe 52 will be properly aligned with the scope 58, and thereby enhancing the realistic aspects of air combat.

As in the previous embodiment, the spring mounting is calibrated so that the tube is even with the centerline of the attacking aircraft 50 at 1 g. The position of the tube 54 relative to the bottom of the attacking aircraft 50 is determined by testing the system on the ground and positioning the tube 54 at the point where the signal generators register a "hit" when the target aircraft 56 is aligned relative to the sight of the attacking aircraft 50.

In a manner identical to the first embodiment, it is preferable that the buzzer 64 be transmitted over a radio transmitter in the target aircraft 64 to the pilot of the attacking aircraft 50. When a "hit" is registered, it is also desirable that the signal generator activate the smoke maker 66 on the target aircraft 56. In this manner, the smoke maker 66 will emit smoke from a tube 68 mounted on the bottom of the target aircraft 56 and simulate an onboard explosion which would result from gunfire or bombing, thus enhancing the drama and realism of the system.

The foregoing description is meant to exemplify, and not to limit, the scope of the present invention. Numerous additional alternative embodiments within the teaching of the invention will be readily apparent to those of skill in the art.

I claim:

1. A system for use with one or more aircraft in mock air battles, comprising:
   an energy source mounted on a target which emits energy;
   power source for generating a current;
   a signal generator connected with said power source which generates a signal in response to the initiation or interruption of current from said power source to said generator, wherein said signal can be perceived by a human being;
   a trigger mechanism mounted within the cockpit of said attacking aircraft for initiating the transmission of current from said power source to said signal generator;
   an energy sensitive switch intermediate said power source and said signal generator, said switch having an first state which prevents the transmission of current from said power source to said signal generator and a second state which permits the transmission of current from said power source to said signal generator, said switch changing between said first state and said second state in response to the exposure of said switch to a given level of energy;
   a sight mounted on said attacking aircraft to assist the aligning of said attacking aircraft with said target; and
   a shield for blocking energy emitted from said energy source from affecting the state of said switch when said target is not aligned with said sight.

2. The system of claim 1, further comprising a device for focusing the energy emitted from said energy source on said switch when said energy source is aligned with said sight to increase the responsiveness of said switch to energy.

3. The system of claim 2, wherein said energy source emits light.

4. The system of claim 3, wherein said device for focusing comprises a pair of parallel optical lenses.

5. The system of claim 2, wherein upon change of said switch between said first state and said second state the state of said switch does not change until said switch is reset.

6. The system of claim 2, wherein said signal generated by said signal generator can be perceived by a pilot in said attacking aircraft.

7. The system of claim 2, wherein said signal generator generates a light which can be perceived by a human being.

8. The system of claim 2, wherein said signal generator generates a noise which can be perceived by a human being.

9. The system of claim 2, wherein said signal generator generates a signal both in said attacking aircraft and at said target.

10. The system of claim 9, wherein said signal generator generates a sound within the cockpit of said attacking aircraft, further comprising a radio transmitter in said attacking aircraft which transmits said sound to a receiver at said target.

11. The system of claim 2, wherein said shield is mounted in a manner so that the position of said shield relative to said switch is affected by the g forces exerted on said attacking aircraft, thereby changing the position relative the sight that said energy source will be aligned with said sight.

12. A system for use with one or more aircraft in mock air battles, comprising:
   an energy source mounted on a target which emits energy;
   a power source for generating a current;
   a signal generator connected with said power source which generates a signal in response to the initiation or interruption of current from said power source to said generator, wherein said signal can be perceived by a human being;
   a trigger mechanism mounted within the cockpit of said attacking aircraft for initiating the transmission of current from said power source to said signal generator;
   an energy sensitive switch intermediate said power source and said signal generator, said switch having an first state which prevents the transmission of current from said power source to said signal generator and a second state which permits the transmission of current from said power source to said signal generator, said switch changing between said first state and said second state in response to the exposure of said switch to a given level of energy;

a shield for blocking energy emitted from said energy source from affecting the state of said switch when said attacking aircraft is not aligned with said target; and a device for focusing the energy emitted from said energy source on said switch when said attacking aircraft is aligned with said target to increase the responsiveness of said switch to energy.

13. The system of claim 12, wherein said energy source emits light.

14. The system of claim 13, wherein said device for focusing comprises a pair of parallel optical lenses.

15. The system of claim 12, wherein said signal generator generates a signal both in said attacking aircraft and at said target.

16. The system of claim 9, wherein said signal generator generates a sound within the cockpit of said attacking aircraft, further comprising a radio transmitter in said attacking aircraft which transmits said sound to a receiver at said target.

17. The system of claim 12, wherein said shield is mounted in a manner so that the position of said shield relative to said switch is affected by the g forces exerted on said attacking aircraft, thereby changing the position relative to the sight that said energy source will be aligned with said attacking aircraft.

18. A system for use with one or more aircraft in mock air battles, comprising:
   an energy source mounted on an attacking aircraft which selectively emits energy;
   a trigger mechanism mounted within the cockpit of said attacking aircraft for initiating the emission of energy from said energy source;
   a power source for generating a current;
   a signal generator mounted on a target connected with said power source which generates a signal in response to the initiation or interruption of current from said power source to said generator, wherein said signal can be perceived by a human being;
   an energy sensitive switch intermediate said power source and said signal generator, said switch having an first state which prevents the transmission of current from said power source to said signal generator and a second state which permits the transmission of current from said power source to said signal generator, said switch changing between said first state and said second state in response to the exposure of said switch to a given level of energy;
   a sight mounted on said attacking aircraft to assist the aligning of said attacking aircraft with said target; and
   a first shield for blocking energy emitted from said energy source from affecting the state of said switch when said target is not aligned with said sight.

19. The system of claim 18, further comprising a device for focusing the energy emitted from said energy source on said switch when said energy source is aligned with said sight to increase the responsiveness of said switch to energy.

20. The system of claim 18, wherein said first shield and said switch are mounted on said target.

21. The system of claim 20, wherein said system further comprises a second shield mounted on said attacking aircraft for blocking energy emitted from said energy source to diminish the range of angles from which said energy source will be able to affect the state of said switch, thereby making it more difficult to align said attacking aircraft with said target.

22. The system of claim 18, wherein said signal generated by said signal generator can be perceived by a pilot in said attacking aircraft.

23. The system of claim 22, wherein said signal includes smoke emitted from said target.

24. The system of claim 18, wherein said second shield is mounted in a manner so that the position of said second shield relative to said switch is affected by the g forces exerted on said attacking aircraft, thereby changing the position relative to the sight that said energy source will be aligned with said sight.

25. A system for use with one or more aircraft in mock air battles, comprising:
   an energy source mounted on an attacking aircraft which selectively emits energy;
   a trigger mechanism mounted within the cockpit of said attacking aircraft for initiating the emission of energy from said energy source;
   a power source for generating a current;
   a signal generator mounted on a target connected with said power source which generates a signal in response to the initiation or interruption of current from said power source to said generator, wherein said signal can be perceived by a human being;
   an energy sensitive switch intermediate said power source and said signal generator, said switch having an first state which prevents the transmission of current from said power source to said signal generator and a second state which permits the transmission of current from said power source to said signal generator, said switch changing between said first state and said second state in response to the exposure of said switch to a given level of energy;
   a first shield for blocking energy emitted from said energy source from affecting the state of said switch when said attacking aircraft is not aligned with said target; and
   a device for focusing the energy emitted from said energy source on said switch when said attacking aircraft is aligned with said target to increase the responsiveness of said switch to energy.

26. The system of claim 25, wherein said first shield and said switch are mounted on said target.

27. The system of claim 26, wherein said system further comprises a second shield mounted on said attacking aircraft for blocking energy emitted from said energy source to diminish the range of angles from which said energy source will be able to affect the state of said switch, thereby making it more difficult to align said attacking aircraft with said target.

28. The system of claim 25, wherein said signal generated by said signal generator can be perceived by a pilot in said attacking aircraft.

29. The system of claim 28, wherein said signal includes smoke emitted from said target.

30. The system of claim 25, wherein said second shield is mounted in a manner so that the position of said second shield relative to said switch is affected by the g forces exerted on said attacking aircraft, thereby changing the position relative to the sight that said energy source will be aligned with said attacking aircraft.

* * * * *